(12) United States Patent
Kyung et al.

(10) Patent No.: US 10,338,280 B2
(45) Date of Patent: Jul. 2, 2019

(54) VARIFOCAL LENS MODULE

(71) Applicant: ELECTRONICS AND TELECOMMUNICATIONS RESEARCH INSTITUTE, Daejeon (KR)

(72) Inventors: Ki Uk Kyung, Daejeon (KR); Sae Kwang Nam, Daejeon (KR); Sung Ryul Yun, Daejeon (KR); Bong Je Park, Daejeon (KR); Sun Tak Park, Incheon (KR); Seung Koo Park, Sejong (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 1 day.

(21) Appl. No.: 15/646,677

(22) Filed: Jul. 11, 2017

(65) Prior Publication Data

US 2018/0017718 A1 Jan. 18, 2018

(30) Foreign Application Priority Data

Jul. 12, 2016 (KR) .................. 10-2016-0088282

(51) Int. Cl.
*G02B 3/10* (2006.01)
*G02B 3/14* (2006.01)
(Continued)

(52) U.S. Cl.
CPC .............. *G02B 3/10* (2013.01); *G02B 3/14* (2013.01); *G02B 7/04* (2013.01); *G02B 7/08* (2013.01); *G02B 7/09* (2013.01); *G02C 7/08* (2013.01); *G02B 13/0075* (2013.01); *G02B 26/0875* (2013.01)

(58) Field of Classification Search
CPC ... G02B 3/10; G02B 3/12; G02B 3/14; G02B 7/02; G02B 7/04; G02B 7/08; G02B 7/09; G02B 7/102; G02B 13/0015; G02B 13/0065; G02B 13/0075; G02B 13/009; G02B 26/0808; G02B 26/0875; G02B 27/646; G02C 7/06; G02C 7/061; G02C 7/063; G02C 7/08; G02C 7/085; G03B 3/10; G03B 13/00; G03B 13/32; G03B 13/34; G03B 13/36; G02F 1/29;
(Continued)

(56) References Cited

U.S. PATENT DOCUMENTS 5,108,429 A * 4/1992 Wiley .................. A61F 2/1613
623/6.22
5,171,266 A * 12/1992 Wiley .................. A61F 2/1613
623/6.22
(Continued)

FOREIGN PATENT DOCUMENTS

KR 10-2014-0125666 A 10/2014

*Primary Examiner* — Loha Ben

(57) ABSTRACT

Disclosed is a varifocal lens module. A varifocal lens module according to an embodiment includes a lens formed of a flexible and transparent material and having a focal length varying according to a variable shape thereof; at least one driving part expanded or contracted in response to an electric signal; and at least one structural body configured to physically or chemically connect the lens and each driving part.

19 Claims, 9 Drawing Sheets

(51) Int. Cl.
  *G02B 7/04* (2006.01)
  *G02B 7/08* (2006.01)
  *G02B 7/09* (2006.01)
  *G02C 7/08* (2006.01)
  *G02B 13/00* (2006.01)
  *G02B 26/08* (2006.01)

(58) Field of Classification Search
  CPC .... G02F 2001/294; A61F 2/16; A61F 2/1613; A61F 2/1624; A61F 2/1627; A61F 2/1635
  USPC ....... 359/319, 355, 665, 823, 820, 822, 648, 359/654, 655, 694, 354, 666, 676, 811, 359/819, 813, 726; 396/72, 73, 75, 77, 396/79, 81, 82, 85–87, 89; 348/345, 351; 623/6.22–6.24, 6.27, 6.29
  See application file for complete search history.

(56) References Cited

U.S. PATENT DOCUMENTS

| | | | | |
|---|---|---|---|---|
| 5,203,788 A * | 4/1993 | Wiley | .................... | A61F 2/1613 623/6.22 |
| 6,038,080 A * | 3/2000 | Schachar | ................ | G02B 3/14 359/666 |
| 6,246,528 B1 * | 6/2001 | Schachar | ................ | G02B 3/14 359/642 |
| 6,493,151 B2 * | 12/2002 | Schachar | ................ | G02B 3/14 359/666 |
| 6,658,208 B2 * | 12/2003 | Watanabe | ............... | G02B 15/10 359/726 |
| 6,930,838 B2 * | 8/2005 | Schachar | ................ | G02B 3/14 359/666 |
| 7,269,344 B2 * | 9/2007 | Nishioka | ........... | G02B 13/0045 348/240.2 |
| 7,440,193 B2 * | 10/2008 | Gunasekaran | ........... | G02B 1/06 359/665 |
| 7,675,686 B2 * | 3/2010 | Lo | ............ | G02B 3/14 359/665 |
| 8,390,939 B2 * | 3/2013 | Henriksen | ................ | G02B 3/14 359/694 |
| 9,091,839 B2 * | 7/2015 | Zhou | ......................... | G03B 5/02 |
| 9,274,320 B2 * | 3/2016 | Zhou | ......................... | G03B 5/02 |
| 9,632,293 B2 * | 4/2017 | Zhou | ......................... | G03B 5/02 |
| 9,709,824 B2 * | 7/2017 | Stevens | .................. | G02C 7/085 |
| 9,746,587 B2 * | 8/2017 | Kyung | .................. | G02B 3/14 |
| 10,082,652 B2 * | 9/2018 | Zhou | ......................... | G03B 5/02 |
| 2007/0133931 A1 | 6/2007 | Lee et al. | | |
| 2008/0131108 A1 | 6/2008 | Kim et al. | | |
| 2011/0058266 A1 | 3/2011 | Chang | | |
| 2015/0205096 A1 | 7/2015 | Nam et al. | | |
| 2015/0319514 A1 | 11/2015 | Hitchcock et al. | | |
| 2016/0062076 A1 | 3/2016 | Ko et al. | | |

* cited by examiner

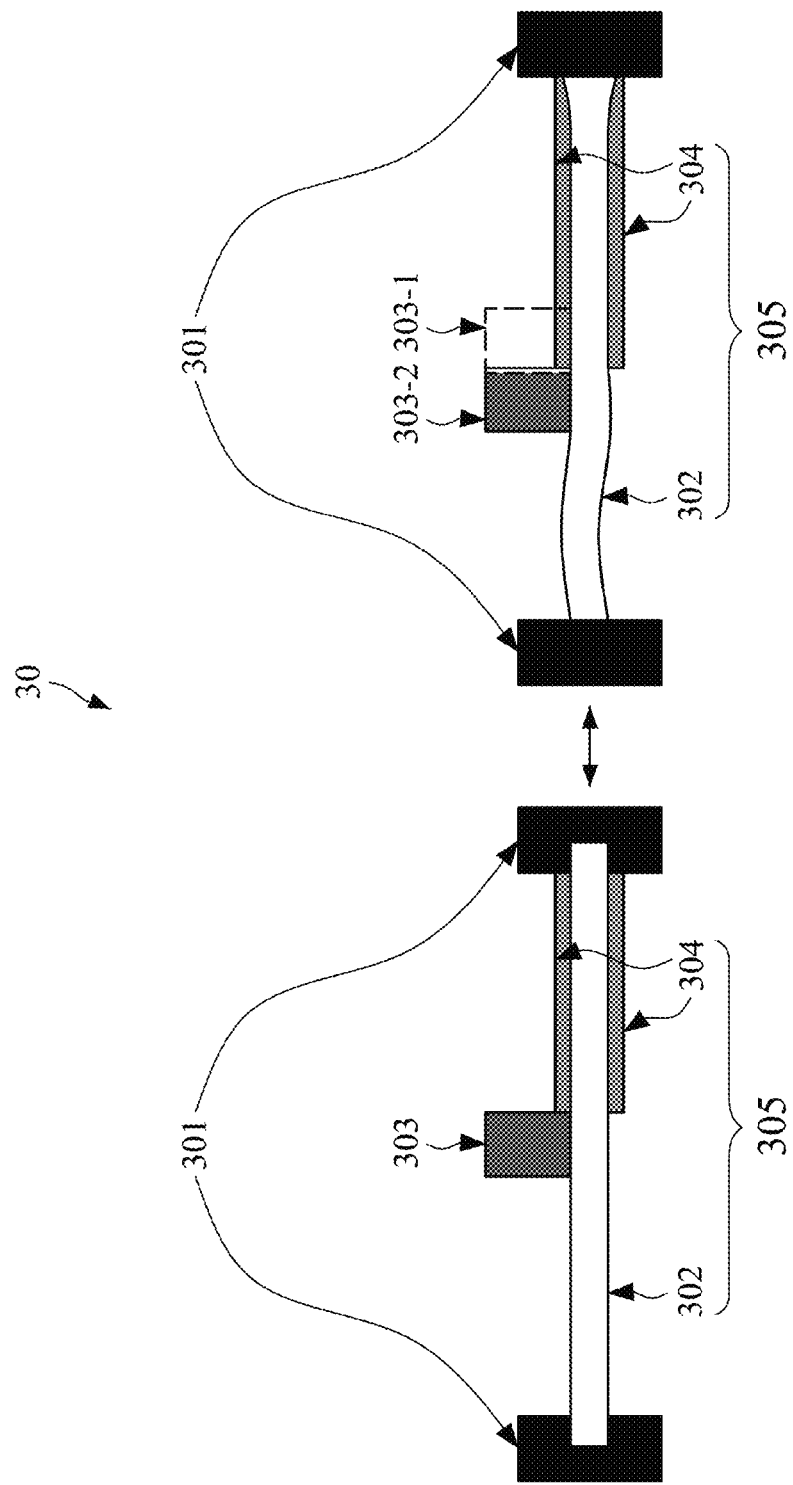

VARIFOCAL LENS MODULE

CROSS-REFERENCE TO RELATED APPLICATION

This U.S. non-provisional patent application claims priority under 35 U.S.C. § 119 of Korean Patent Application No. 10-2016-0088282, filed on Jul. 12, 2016, the entire contents of which are hereby incorporated by reference.

BACKGROUND

The present disclosure herein relates to a lens technique, and more particularly, to a varifocal lens technique.

Optical lenses are formed of a rigid material, such as glass or plastic, which is not easily deformed. In this case, when a subject is to be viewed through a lens, it is inconvenient to move the lens in the optical axis direction to focus the subject. Due to this limitation, most cameras requisitely have cylindrical lens barrels, and should use a method of rotating a motor inside the lens to automatically move the lens.

SUMMARY

The present disclosure provides a varifocal lens module capable of actively adjusting a focus even without a motion in the optical axis direction.

An embodiment of the inventive concept provides a varifocal lens module including: a lens formed of a flexible and transparent material and having a focal length varying according to a variable shape thereof; at least one driving part expanded or contracted in response to an electric signal; and at least one structural body configured to physically or chemically connect the lens and each driving part.

In an embodiment, each driving part may have a structure expanded in advance to induce a driving direction. In an embodiment, each driving part may include: a material layer having a dielectric constant; and an electrode coupled to the material layer to receive an applied electric signal. In an embodiment, the material layer may be formed of a flexible material and may have an expandable shape. In an embodiment, the electrode may be formed of a flexible material and may have an expandable shape. In an embodiment, each structural body may have an amount of movement determined by at least one among a thickness of the material layer, a dielectric constant of the material layer, the strength of an electric signal applied to the electrode, and a reaction force applied by the lens. In an embodiment, when a first electrode positioned on an inner side with respect to the structural body receives an applied electric signal, the structural body may be moved outward to expand the lens connected to the structural body, and when a second electrode positioned on an outer side receives an applied electric signal, the structural body may be moved inward by the electric signal to contract the lens connected to the structural body.

In an embodiment, each of a plurality of structural bodies and each of a plurality of driving parts may be disposed in pairs in a radial shape with respect to a center of the lens. In an embodiment, each of a plurality of structural bodies and each of a plurality of driving parts may be disposed in pairs in a radial shape with respect to a center of the lens.

In an embodiment, a plurality of driving parts individually may receive as many electric signals and may be individually moved in response to the input electrical signals.

In an embodiment, each structural body may be physically or chemically connected to a periphery of the lens to thereby change shapes of the moving structural body and the connected lens.

In an embodiment, when each structural body is moved outward with respect to the center of the lens, the lens or a portion of the lens connected to the structural body may be deformed outward by a moving force and thereby, the lens may be expanded, and when each structural body is moved inward with respect to the center of the lens, the lens or a portion of the lens connected to the structural body may be deformed inward by the moving force and thereby the lens is contracted.

In an embodiment, the structural body paired with an individual driving part by an individual operation may be moved by the movement of the driving part, and thereby, each driving part may affect deformation of the lens connected to the driving part.

In an embodiment, the varifocal lens module may further include a frame having a fixed shape and configured to induce a driving direction of the driving part when the driving part is operated. In an embodiment, the electrical signal may be a potential difference or a voltage.

In an embodiment of the inventive concept, a varifocal lens module includes: a lens formed of a flexible and transparent material and having a focal length varying according to a variable shape thereof; a pair of electrodes positioned over and under a material layer and configured to receive an applied electric signal; a material layer positioned between the pair of electrodes and configured to be expanded or contracted by an applied electric signal when the electric signal is applied to the pair of electrodes; and a structural body configured to physically or chemically connect the lens and the material layer to thereby change a shape of the lens according to expansion or contraction of the material layer.

In an embodiment, the structural body may be moved in a horizontal direction in response to an electric signal applied to the electrodes to thereby expand or contract the lens connected to the structural body. In an embodiment, the structural body may have an amount of movement, a force applied thereto during movement, and a behavior state, at least one of which may be determined according to at least one among positions of the electrodes, configuration methods of the electrode, and materials of the electrodes.

In an embodiment of the inventive concept, a varifocal lens module includes: a lens formed of a flexible and transparent material and having a focal length varying according to a variable shape thereof; a pair of first electrodes positioned over and under a material layer on an inner side with respect to a structural body and configured to receive an applied electric signal; a pair of second electrodes positioned over and under a material layer on an outer side with respect to the structural body and configured to receive an applied electric signal; a material layer positioned between the pairs of first and second electrodes and configured such that when an electric signal is applied to the pair of first electrodes or the pair of second electrodes, a side affected by the applied electric signal is expanded or contracted; and a structural body configured to physically or chemically connect the lens and the material layer to thereby change a shape of the lens according to expansion or contraction of the material layer.

In an embodiment, when the pair of first electrodes positioned on an inner side with respect to the structural body receives an applied electric signal, the structural body may be moved outward to expand the lens connected to the structural body, and when the pair of second electrodes positioned on an outer side receives an applied electric signal, the structural body may be moved inward to contract the lens connected to the structural body.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 9 is a cross-sectional view of a varifocal lens module for describing a principle of a driving part according to an embodiment of the inventive concept.

DETAILED DESCRIPTION

Figure 1:
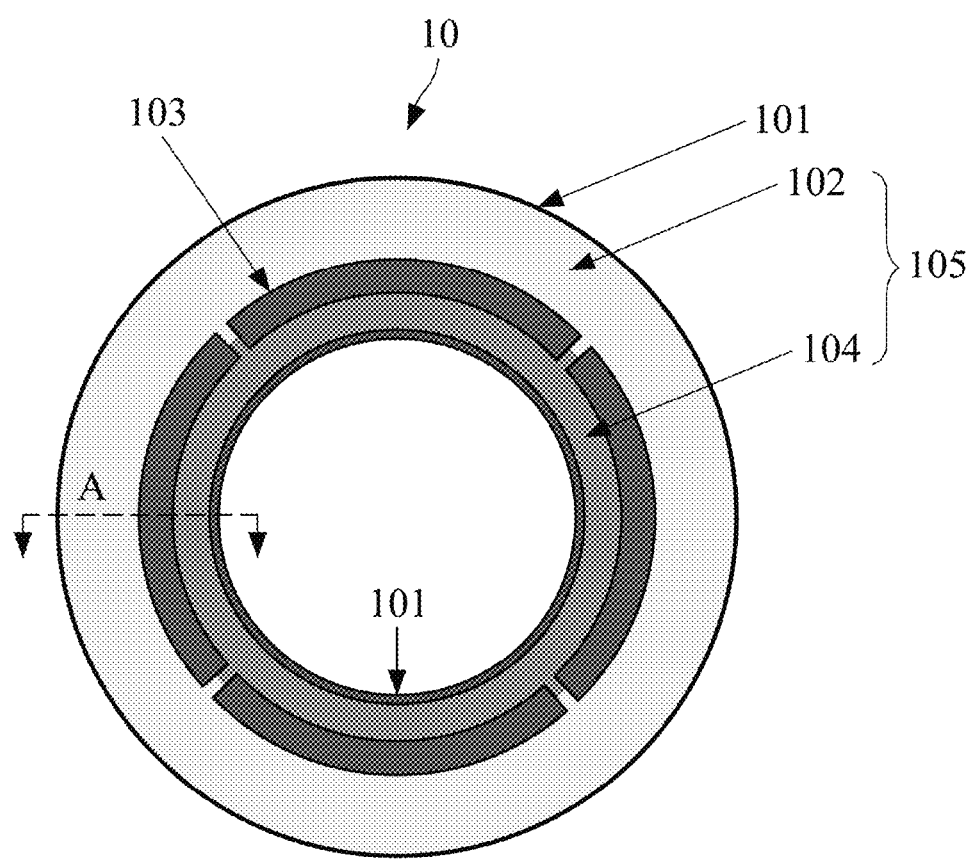
FIGS. 1 to 3 are structural views of a varifocal lens module according to an embodiment of the inventive concept.

Advantages and features of the present disclosure, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description of embodiments, a detailed description of known functions or configurations incorporated herein will not be provided when it is determined that the detailed description thereof may unnecessarily obscure the subject matter of the inventive concept.

Terms described below are defined in consideration of functions in embodiments of the inventive concept, and may differ according to the intention or practice of a user or an operator. Therefore, the definitions of the terms should be determined based on the contents throughout the specification.

Hereinafter, embodiments of the present invention will be described in detail with reference to the accompanying drawings. However, exemplary embodiments of the present invention that will be described below may be modified into various forms, and the scope of the present invention should not be construed as limited to the embodiments to be described below in detail. Embodiments of the inventive concept will be given to those skilled in the art to more thoroughly describe the inventive concept.

Figure 2:
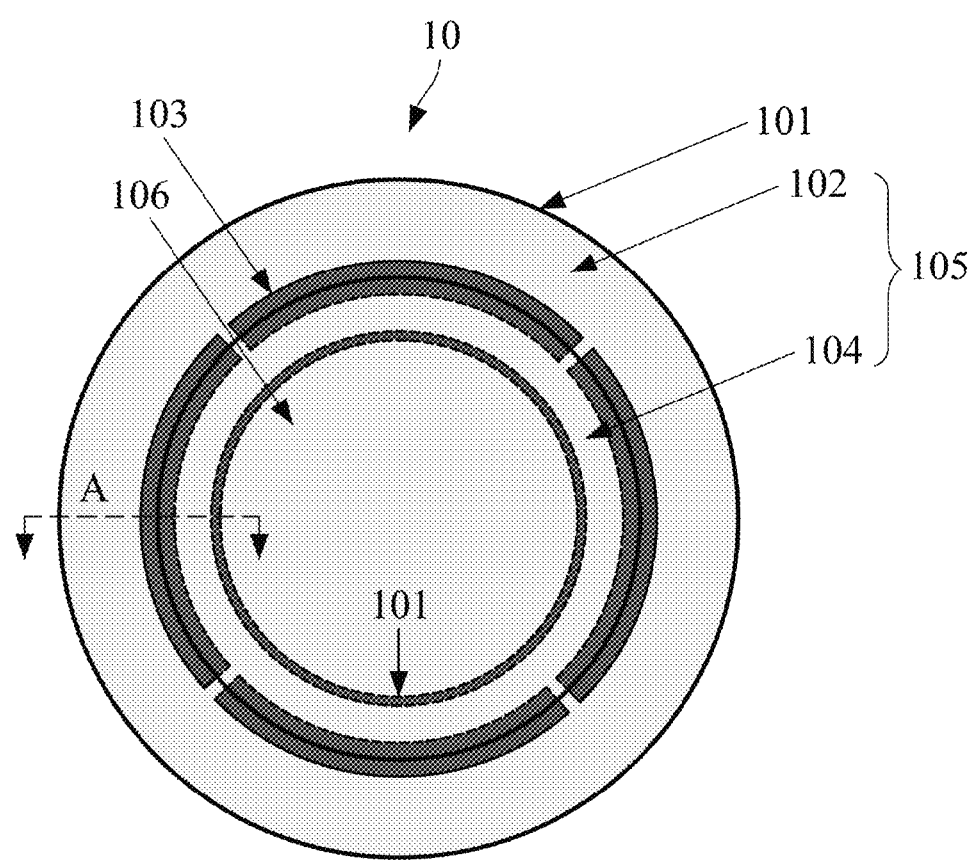
Figure 3:
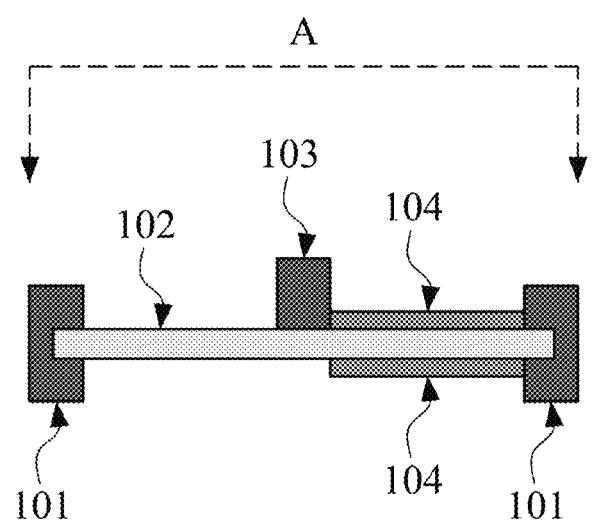

FIGS. 1 to 3 are structural views of a varifocal lens module according to an embodiment of the present disclosure. Specifically, FIGS. 1 and 2 are plan views of a varifocal lens module 10, and FIG. 1 is a view in which a lens 106 is removed from of the view of FIG. 2. FIG. 3 is a side view of one portion A of the varifocal lens module 10 of FIG. 1.

The varifocal lens module 10 is formed in a thin and simple structure. Breaking away from a lens which is focused through a method of moving in the optical axis direction using a motor or the like, a focus is changed such that a lens 106 is deformed according to a movement of a driving part 105 connected to the periphery thereof without moving the lens 106. Accordingly, the miniaturization and the high response speed of the lens module may be expected.

The varifocal lens module 10 does not move a lens in the optical axis direction to change optical information input through the lens, but changes the optical information through the shape of the lens 106 variable in place. Since the typical rigid lens is manufactured to have flexibility, the shape deformation of the lens 106 may be induced by pulling or contracting the lens 106 itself. A medium inducing the expansion or contraction may be the driving part 105 which is an actuator inducing a movement in response to an input of an electric signal.

Hereinafter, a structure of the varifocal lens module 10 having an above-described characteristic will be described.

Referring to FIGS. 1 to 3, the varifocal lens module 10 includes a lens 106, a driving part 105, and a structural body 103. The lens 106 is formed of a flexible and transparent material and has a focal length changed due to a variable shape thereof. The driving part 105 is expanded or contracted in response to an electrical signal. The electrical signal may be a potential difference or a voltage. Since being expanded or contracted in response to an electric signal, the force generated by the driving part 105 may be referred to as an electric field force. The electric field force has a merit of having a fast responding speed. The structural body 103 physically or chemically connects the lens 106 and the driving part 105. The connecting method is not limited to a specific method.

The structural body 103 and the driving part 105 may be disposed in pairs in a radial shape with respect to the center of the lens 106. In another example, the structural body 103 and the driving part 105 may be disposed in pairs in an array shape.

The driving part 105 according to an embodiment may include a material layer 102 and an electrode 104. The material layer 102 is formed of a film-shaped thin material having excellent flexibility while having a specific dielectric constant or permittivity. The material layer 102 may be fixed to an inner and outer frame 101 (expressed by a line) while being expanded in a radial shape. The expanded material layer 102 is positioned at a middle height of the frame 101 and is in a state of not being bent toward a bottom but being floated because the film is maintained at a taut state when the frame 101 is placed on the bottom. The structural body 103 may have an amount of movement which can be determined by at least one among the thickness of the material layer 102, the permittivity of the material layer 102, the strength of an electric signal applied to the electrode 104, and the reaction force applied by the lens 106.

A pair of electrodes 104 are positioned over and under the material layer 102, and the structural body 103 is positioned at a center on an upper end of the material layer 102 and thereby connected to the electrode 104. When an electric signal is applied to the pair of electrodes 104, the material layer 102 is expanded or contracted, and the structural body 103 placed on the material layer 102 moves to a surface direction. Then, the lens 106 connected to the structural body 103 is expanded or contracted. Here, with respect to a wide surface of the lens, the surface direction does not mean a vertical direction which is the optical axis direction, but a horizontal direction.

The driving part 105 and the structural body 103 may be provided in plurality. For example, as illustrated in FIGS. 1 and 3, four driving parts 105 and four structural bodies 103 are provided, and the four driving parts 105 may individually receive as many electric signals and may individually move in response to the input electric signal. Each structural body 103 is physically or chemically connected to the lens 106 or to the periphery of the lens 106 and may change the shape of the lens 106 connected to the moving structural body 103. A structural body 103 paired with an individual driving part 105 by an individual operation is moved by the movement of the driving part 105 and thereby, each driving part 105 affects the deformation of the lens 106 connected to the driving part 105.

FIG. 3 is a cross-sectional view of a ring of FIG. 1. The expanded material layer 102 is fixed to the frame 101 and is maintained well without being bent by gravitational force, and the structural bodies 103 are fixed on the taut material layer 102. The structural bodies 103 are outwardly expanded with respect to the center of a circle by an electric signal applied to the electrodes 104. The electrodes 104 are implemented to perform an original function of the electrodes 104 even when being flexible or expanded.

Figure 4:
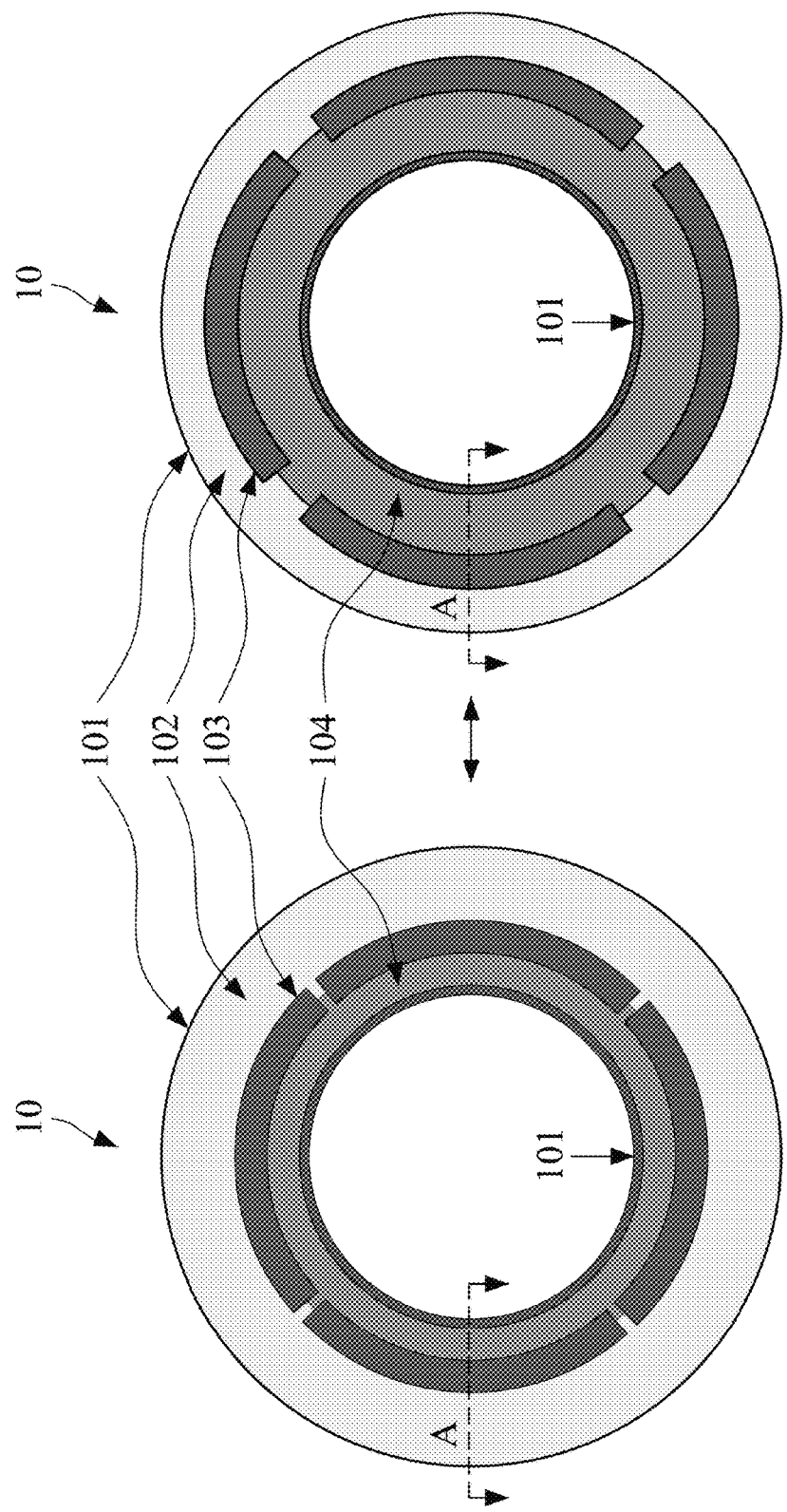
FIG. 4 is a structural view for describing a process in which the position of a structural body of the varifocal lens module of FIGS. 1 to 3 is changed according to the movement of a driving part.

FIG. 4 is a structural view of a varifocal lens module for describing a process in which the positions of structural bodies of the varifocal lens module of FIGS. 1 to 3 are changed according to the movements of driving parts.

The view on the left of FIG. 4 is a view illustrating a shape of a driving part before an electric signal is applied to electrodes 104, and the view on the right of FIG. 4 is a view illustrating a shape of the driving part after an electric signal is applied to electrodes 104. When an electrical signal is applied to the electrodes 104, as in the view on the right of FIG. 4, the material layer 102 between the electrodes 104 is outwardly expanded and thereby, the structural bodies 103 are also outwardly moved. When the structural bodies 103 are outwardly moved, while a flexible lens connected to the structural bodies 103 is expanded, the focal length of the expanded lens is decreased.

Although the electrodes 104 are positioned at the inner side with respect to the structural bodies 103 as illustrated in FIG. 4, the electrodes 104 may not be limited to be necessarily positioned at the inner side with respect to the structural bodies 103. Also, according to the position of the electrodes 104, a configuring method of the electrodes 104, a material of the electrodes 104, or the like, an amount of movement and force applied during movement of the structural bodies 103, and a behavior state of each of the structural bodies 103 may vary.

Figure 5:
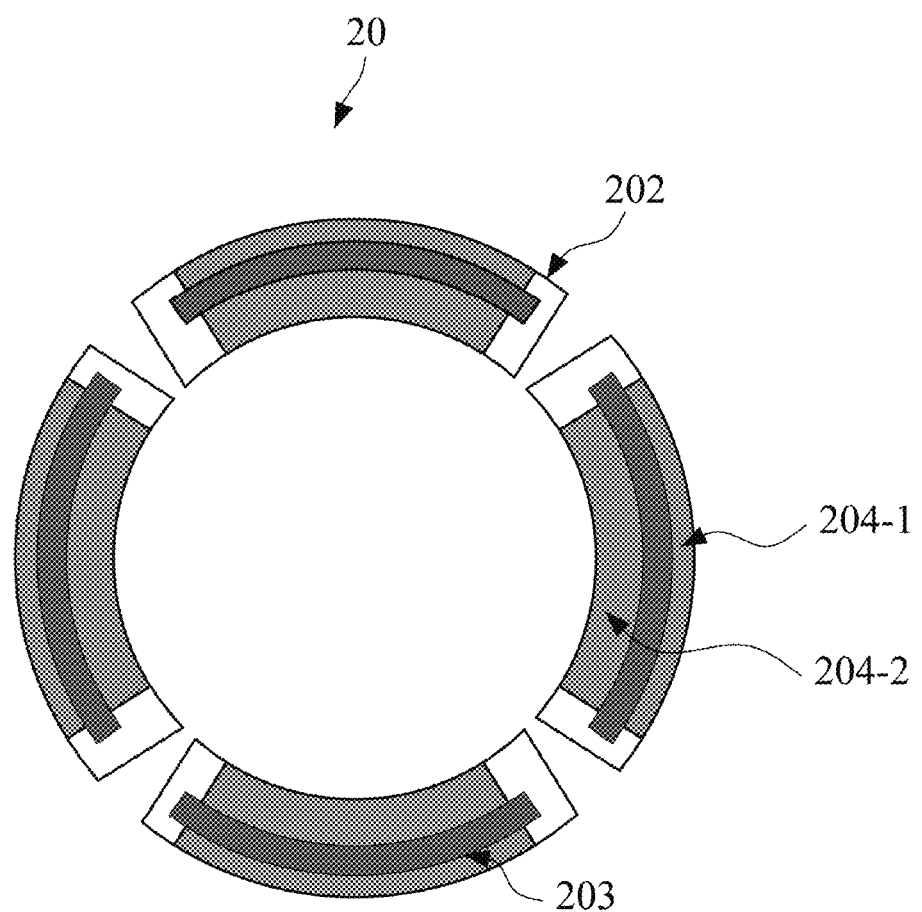
FIGS. 5 to 7 are structural views of a varifocal lens module according to another embodiment of the inventive concept.
Figure 6:
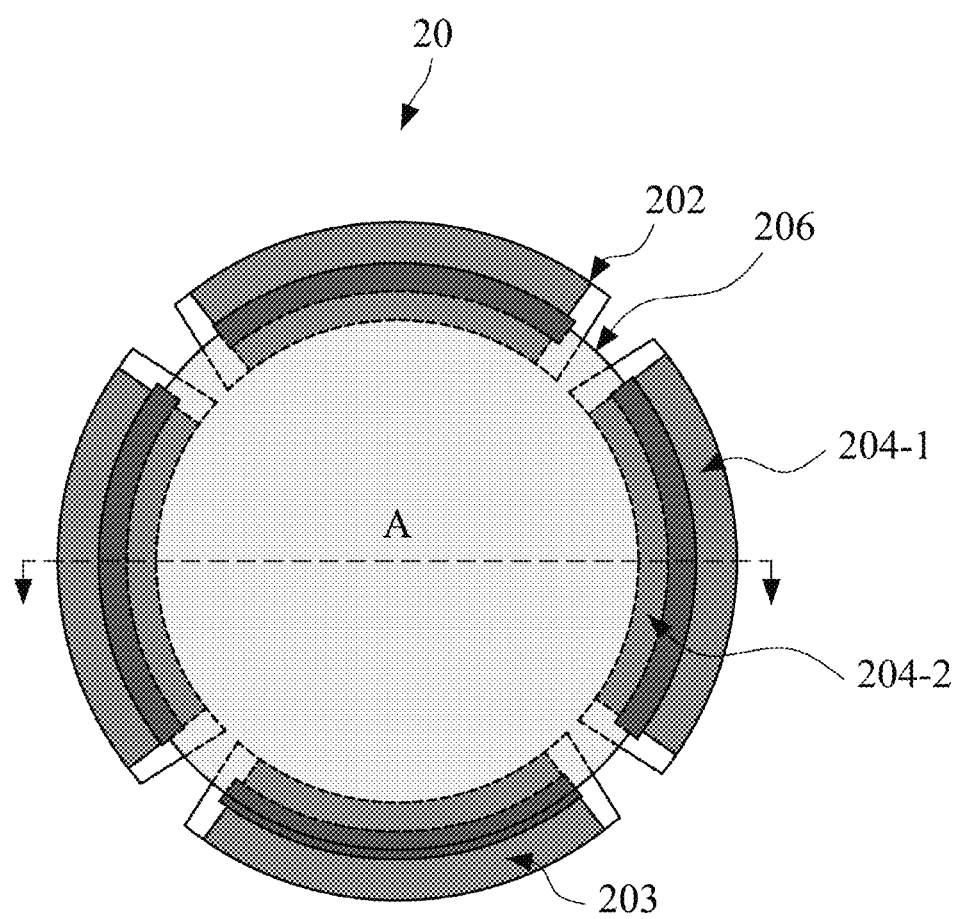
Figure 7:
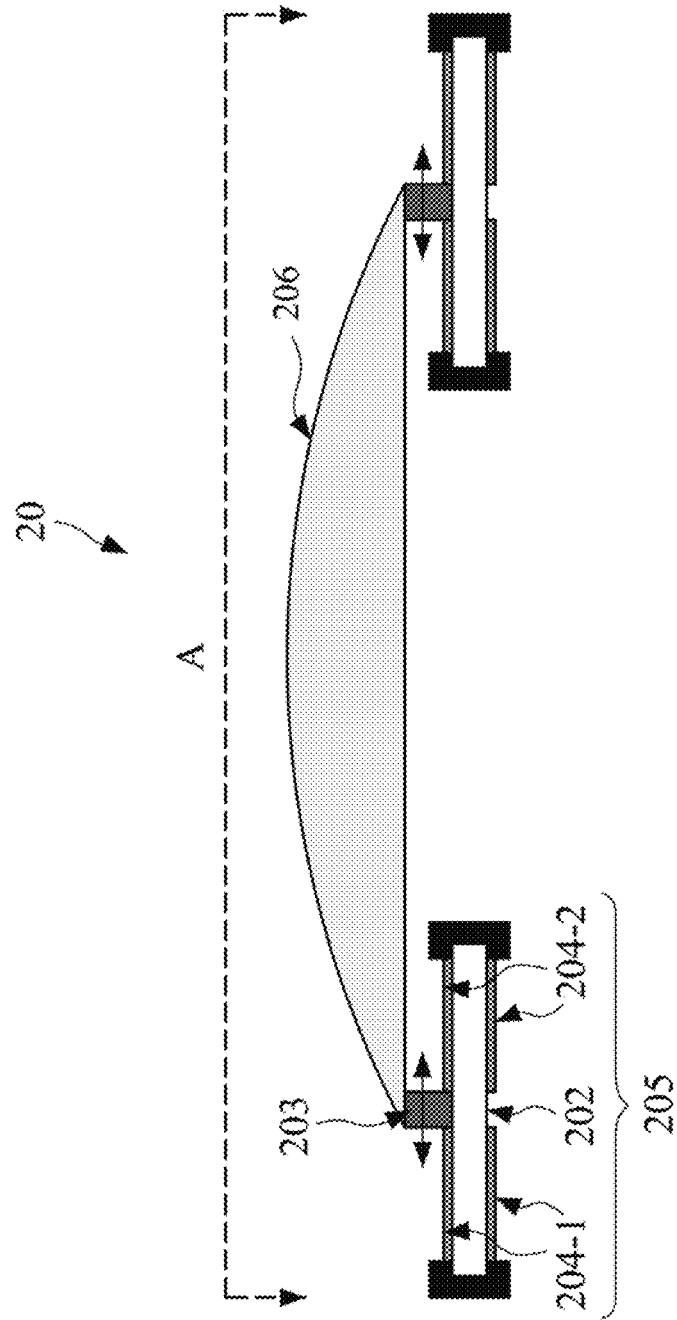

FIGS. 5 to 7 are structural views of a varifocal lens module according to an embodiment of the inventive concept. Specifically, FIGS. 5 and 6 are plan views of a varifocal lens module 20, and FIG. 5 is a view in which a lens 206 is removed from the view of FIG. 6. FIG. 7 is a side view of one portion A of the varifocal lens module 20 of FIG. 5.

Referring to FIGS. 5 to 7, the varifocal lens module 20 includes a lens 206, a driving part 205, and a structural body 203. The driving part 205 may include a material layer 202 and two pairs of electrodes 204-1 and 204-2.

The difference between the varifocal lens module 10 described above with reference to FIGS. 1 to 3 and the varifocal lens module 20 to be described later with reference to FIGS. 5 to 7 is that firstly, in the varifocal lens module 20 of FIGS. 5 to 7, a lens 206 having transparency and excellent flexibility is disposed on the four structural bodies 203. While, in FIGS. 1 to 3, four structural bodies 103 may be moved in only outward direction with only one pair of electrodes 104, in FIGS. 5 to 7, a total of four structural bodies 203 may be moved one by one, that is, in inward and outward directions with two pairs of electrodes 204-1 and 204-2. In other words, in FIGS. 1 to 3, while only one pair of electrodes 104 are provided, in FIGS. 5 to 7, two pairs of electrodes 204-1 and 204-2 are provided.

Figure 8:
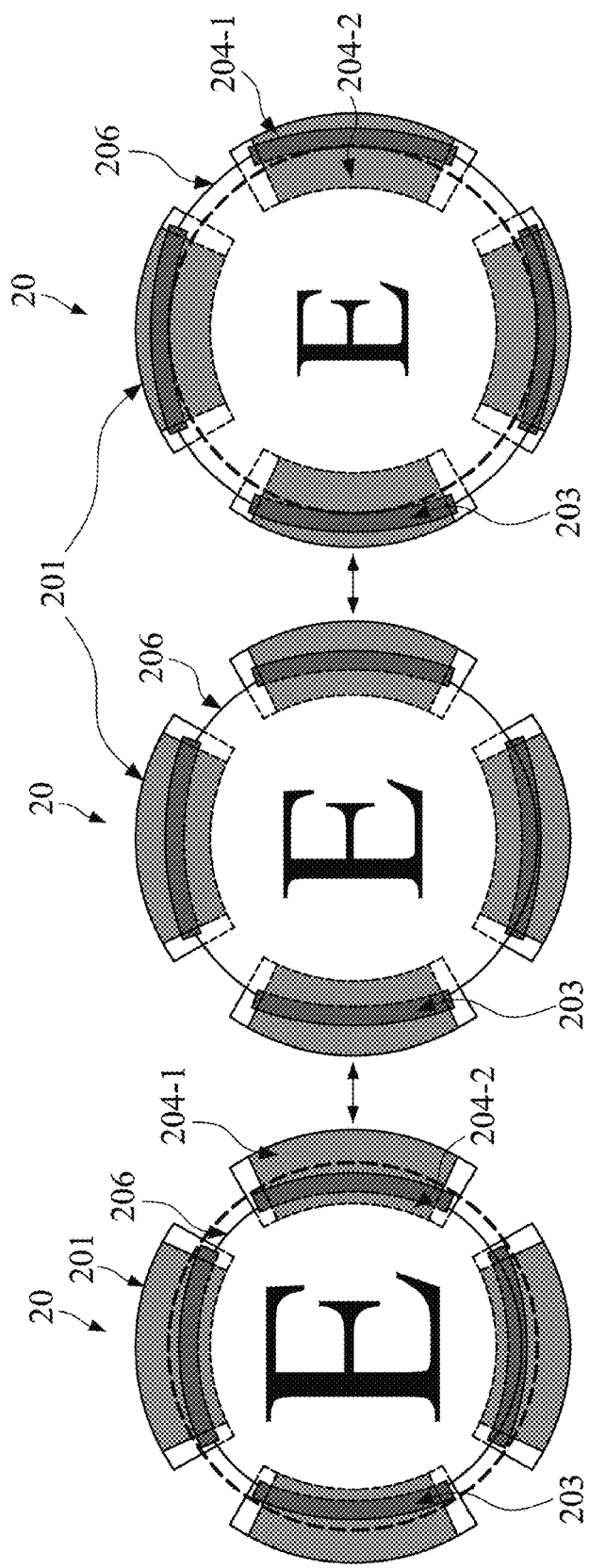
FIG. 8 is a structural view of the varifocal lens module for describing a process in which the varifocal lens module of FIGS. 5 to 7 expands the lens according to a movement of the driving part.

FIG. 8 is a structural view of the varifocal lens module for describing a process in which the varifocal lens module of FIGS. 5 to 7 expands the lens according to a movement of the driving part.

Referring to FIG. 8, in the varifocal lens module 20, the structural bodies 203 connected to the driving parts 205 are moved according to the movements of the driving parts 205. When the structural bodies 203 are moved, the lens 206 connected to the structural bodies 203 is expanded.

The varifocal lens module in the middle of FIG. 8 which serves as a reference has a structure in which the lens 206 is attached to the structural bodies 203 without contraction or expansion of the lens 206. The view on the right of FIG. 8 illustrates a state in which the four structural bodies 203 is outwardly moved in response to a unified input electric signal applied to four electrodes 204-1 and 204-2, and thereby, the lens 206 is expanded. Conversely, the view on the left of FIG. 8 illustrates a state in which the four structural bodies 203 are inwardly moved in response to a unified input electric signal applied to four electrodes, and thereby, the lens 206 is contracted.

Hereinafter, with reference to FIG. 8, a process in which the focal length of the lens 206 is changed according to the movements of the structural bodies 203. In all driving parts 205 of FIG. 8, the inner side electrodes 204-2 are positioned at the inner side with respect to the structural bodies 203 and outer side electrodes 204-1 are positioned at the outer side with respect to the structural bodies 203. As in the view on the right of FIG. 8, when an electric signal is applied in the direction toward the center of a circle with respect to the structural bodies 203, that is, to the inner side electrode 204-2, the inner side electrode 204-2 is outwardly expanded and thereby, the structural bodies 203 are outwardly moved, and this is connected to the expansion of the lens 206. Consequently, while the lens 206 is expanded, the focal length of the expanded lens 206 is decreased, and the letter "E" positioned under the lens 206 may be viewed smaller than the existing letter. Conversely, as in the view on the left of FIG. 8, when an electric signal is applied in the outward direction with respect to the structural bodies 203, that is, to the outer side electrode 204-1, the outer side electrode 204-1 is inwardly expanded and thereby, the structural bodies 203 are inwardly moved, and this is connected to the contraction of the lens 206 Consequently, while the lens 206 is contracted, the focal length of the contracted lens 206 is increased, and the letter "E" positioned under the lens 206 may be viewed greater than the existing letter. In FIG. 8, the circle depicted by a dotted line represents a size of the lens 206 prior to expansion or contraction.

FIG. 9 is a cross-sectional view of a varifocal lens module for describing a principle of a driving part according to an embodiment of the inventive concept.

The view on the left of FIG. 9 is a view of a varifocal lens module 30 before applying an electric signal, and the view on the right is a view after applying the electric signal. A material layer 302 is positioned between fixed frames 301. The material layer 302 may be a material having a specific dielectric constant and excellent flexibility. For example, the material layer 302 may have a film shape. In particular, the material layer 302 may be a polymer film. The polymer film may be an elastomeric material and may representatively be polydimethylsiloxane (PDMS) or a VHB film of 3M Company. When an electric signal is applied to the electrodes 304, the material layer 302 is fixed to a frame 301 in a state of being expanded in order to induce the movement direction of the structural bodies 303. For example, the material layer 302 is fixed while being expanded in a radial type in a surface direction.

The structural bodies 303 are physically or chemically fixed to the material layer 302. For the structural bodies 303, any material may be used if only force is transferred well to a lens in a short time according to the operation of a driving part 305. Accordingly, the material layer 302 and the structural bodies 303 may also be fixed by using an instantaneous adhesive or an adhesive material such as a double-sided tape therebetween, if necessary. The embodiment with reference to FIG. 9 is merely an example, and in order to effectively transfer a force for movement or operation, it is also possible to make the shape of a structure more complicated.

As illustrated in FIG. 9, in the driving parts 305, only one pair of electrodes 304 may be positioned in one region of the material layer 302, for example, in an outer region at upper and lower positions. Here, a material of the electrodes 304 may be a material formed of a highly flexible material and having excellent conductivity or may be a material in which micro particles having excellent conductivity is formed in a network structure, and the structure is maintained even under expansion/contraction of the material to thereby have a not bad conductivity. For example, the material of the electrodes may be graphene, carbon nanoparticle, carbon nanotube, silver nanowire, or the like.

While the material layer 302 having a dielectric property is positioned between the electrodes 304, when an electric signal, such as a voltage, is applied to both ends of the electrodes 304, the material layer 302 may be contracted due to an electrostatic force generated between the electrodes 304. When the material layer 302 having a constant volume is contracted by a voltage and the thickness thereof is decreased by a contraction force at the portion of the electrodes 304, the material layer 302 is expanded toward the side to which the force is not applied in a surface direction, and thereby, the structural bodies 303 are moved (from 303-1 to 303-2). Here, the electrodes 304 may also be expanded by the volume expansion in the surface direction, and when being excessively expanded, as illustrated in the view on the right of FIG. 9, the cross-section thereof may be bent at one unrestricted portion of the material layer 302.

The shapes of the material layer 302 and the electrodes 304 may return to the shape like the view on the left of FIG. 9 while the voltage applied to both ends of the electrodes 304 is removed. An amount of movement of the structural bodies 303 is determined by various factors, such as the thickness of the material layer 302, the dielectric constant of the material layer 302, the strength of applied electric signal (potential difference; voltage), and reaction force applied by the lens. When the input electric signal is not an ON/OFF form but varies in real time, the deformation of the lens may be adjusted in real time.

Table 1 shows a strain of a lens expanded when an electric signal is applied to a completed varifocal lens module.

TABLE 1

| Applied voltage (kV) | Area strain (%) |
|---|---|
| 0 | 0 |
| 2.4 | 3.1 |
| 2.8 | 6.1 |
| 3.2 | 9.3 |
| 3.6 | 12.5 |
| 4.0 | 15.7 |
| 4.4 | 19.0 |
| 4.8 | 20.7 |
| 5.2 | 22.3 |

Table 1 is an experimental result regarding how much a surface expansion occurs compared to the existing size such that structural bodies are outwardly moved with respect to a central point by the application of an electric signal, and in which the amount of expansion of a flexible lens connected to the structural bodies by the movement of the structural bodies is recorded. When calculating a strain, an initial value was set a reference value (0%) to a cross-sectional area of a lens having diameter of about 5 mm when a voltage or potential difference was not applied to a material layer.

Since the deformation of the lens due to application of an electrical signal may remarkably varies according to the physical properties of the flexible lens and the material layer, material information of the material layer is defined through Table 2, and material information of the lens is simply defined through Table 3. However, a great number of factors such as the difference in electrode patterns or the differences in experimental environment, may be related to the performance of the varifocal lens module.

TABLE 2

| Item | Value |
|---|---|
| Thickness | 60 μm |
| Normal Tensile | 690 KPa |

TABLE 3

| Item | Value |
|---|---|
| Thickness | 0.2 (Periphery)~1.2 (Central portion) mm |
| Normal Tensile | 1.8 N/mm$^2$ |
| Viscosity | 1,800 mPa s |

As understood from strain information of Table 3, it may be understood that an area strain (%) has a trend of gradually increasing as an applied voltage (kV) increases.

With reference to the drawings, a camera may be made by overlapping several varifocal lenses described above. For example, a zoom camera may be formed, and in this case, a more compact design may be carried out.

Until now, preferred embodiments of the present invention are described mainly. It will be understood by those skilled in the art that various changes in form and details may be made therein without departing from the spirit and scope of the invention as defined by the appended claims. Therefore, the preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A varifocal lens module comprising:
a lens formed of a flexible and transparent material and having a focal length varying according to a variable shape thereof;
a driving part deformed in response to an electric signal; and
a structural body configured to connect the lens and the driving part,
wherein the structural body is moved by deformation of the driving part,
wherein the variable shape of the lens is changed by the movement of the structural body,
wherein the driving part comprises:
a material layer;
an upper electrode provided on a top surface of the material layer; and
a lower electrode provided on a bottom surface of the material layer,
wherein the electric signal is applied to the upper and lower electrodes, and
wherein the material layer is expanded when the electric signal is applied to the upper and lower electrodes.

2. The varifocal lens module of claim 1, wherein each of the material layer, the upper electrode, and the lower electrode has a ring shape, and
wherein the material layer, the upper electrode, and the lower electrode vertically overlap each other.

3. The varifocal lens module of claim 1, wherein the material layer is formed of a flexible material and has an expandable shape.

4. The varifocal lens module of claim 1, wherein each of the upper and lower electrodes is formed of a flexible material and has an expandable shape.

5. The varifocal lens module of claim 1, wherein the structural body has an amount of movement determined by at least one among a thickness of the material layer, a dielectric constant of the material layer, a strength of the electric signal applied to the upper and lower electrodes, and a reaction force applied by the lens.

6. The varifocal lens module of claim 1, wherein the upper electrode comprises a first upper electrode provided at one side of the structural body,
wherein the lower electrode comprises a first lower electrode facing the first upper electrode, and
wherein the electric signal is applied to the first upper and first lower electrodes to expand a first portion of the material layer therebetween.

7. The varifocal lens module of claim 6, wherein the upper electrode further comprises a second upper electrode provided at another side of the structural body,
wherein the lower electrode further comprises a second lower electrode facing the second upper electrode, and
wherein the electric signal is applied to the second upper and second lower electrodes to expand a second portion of the material layer therebetween.

8. The varifocal lens module of claim 1, wherein the structural body is provided in plurality, and
wherein the plurality of structural bodies are disposed in a radial shape with respect to a center of the lens.

9. The varifocal lens module of claim 8,
wherein the driving part is provided in plurality, and
wherein each of the plurality of structural bodies and each of the plurality of driving parts are disposed in pairs in the radial shape with respect to the center of the lens.

10. The varifocal lens module of claim 9, wherein the plurality of driving parts are spaced apart from each other.

11. The varifocal lens module of claim 9, wherein the plurality of driving parts individually receive electric signals and are individually moved in response to the received electric signals.

12. The varifocal lens module of claim 1, further comprising frames provided at inner and outer sides of the material layer, respectively,
wherein the frames have a fixed shape and are configured to induce a driving direction of the driving part when the driving part operates.

13. The varifocal lens module of claim 1, wherein the electric signal is a potential difference or a voltage.

14. The varifocal lens module of claim 1, wherein a top surface of the structural body is in contact with a bottom surface of the lens, and
wherein a bottom surface of the structural body is in contact with the top surface of the material layer.

15. The varifocal lens module of claim 1, wherein the structural body is moved in a horizontal direction parallel to the top surface of the material layer.

16. A varifocal lens module comprising:
a lens including a flexible and transparent material and having a focal length varying according to a variable shape thereof;
a structural body coupled to the lens; and
a driving part coupled to the structural body and causing the structural body to move in a direction perpendicular to an optical axis direction of the lens in response to an electrical signal,
wherein the variable shape of the lens is changed by the movement of the structural body.

17. The varifocal lens module of claim 16, wherein the driving part includes a first pair of electrodes and a material layer disposed between the first pair of electrodes.

18. The varifocal lens module of claim 17, wherein the driving part causes the structural body to move in a first radial direction when the electrical signal is applied to the first pair of electrodes, the first radial direction being perpendicular to the optical axis direction of the lens.

19. The varifocal lens module of claim 18, wherein the first pair of electrodes of the driving part is disposed at a first side of the structural body, and
wherein the driving part further includes a second pair of electrodes disposed at a second side of the structural body, the driving part causes the structural body to move in a second radial direction when the electrical signal is applied to the second pair of electrodes, the second radial direction being opposite to the first radial direction.

* * * * *